UNITED STATES PATENT OFFICE.

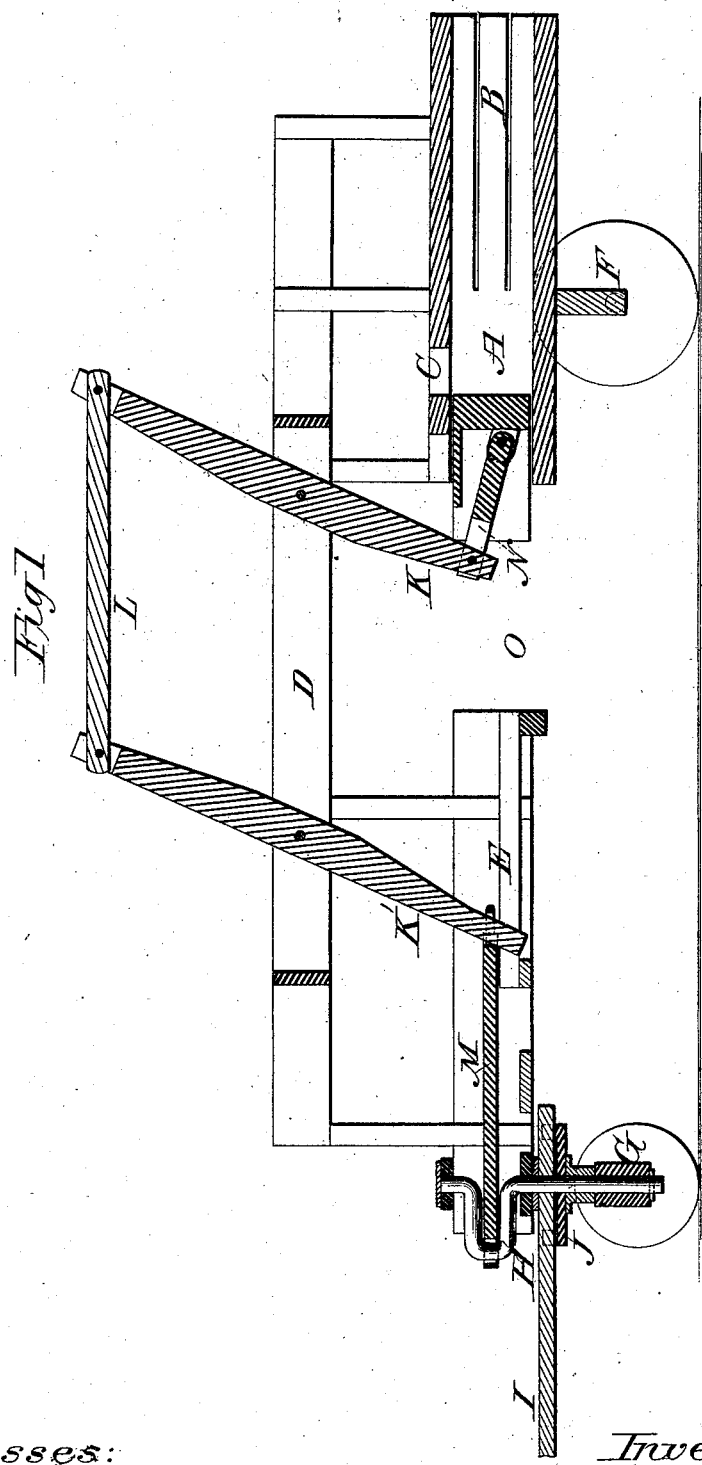

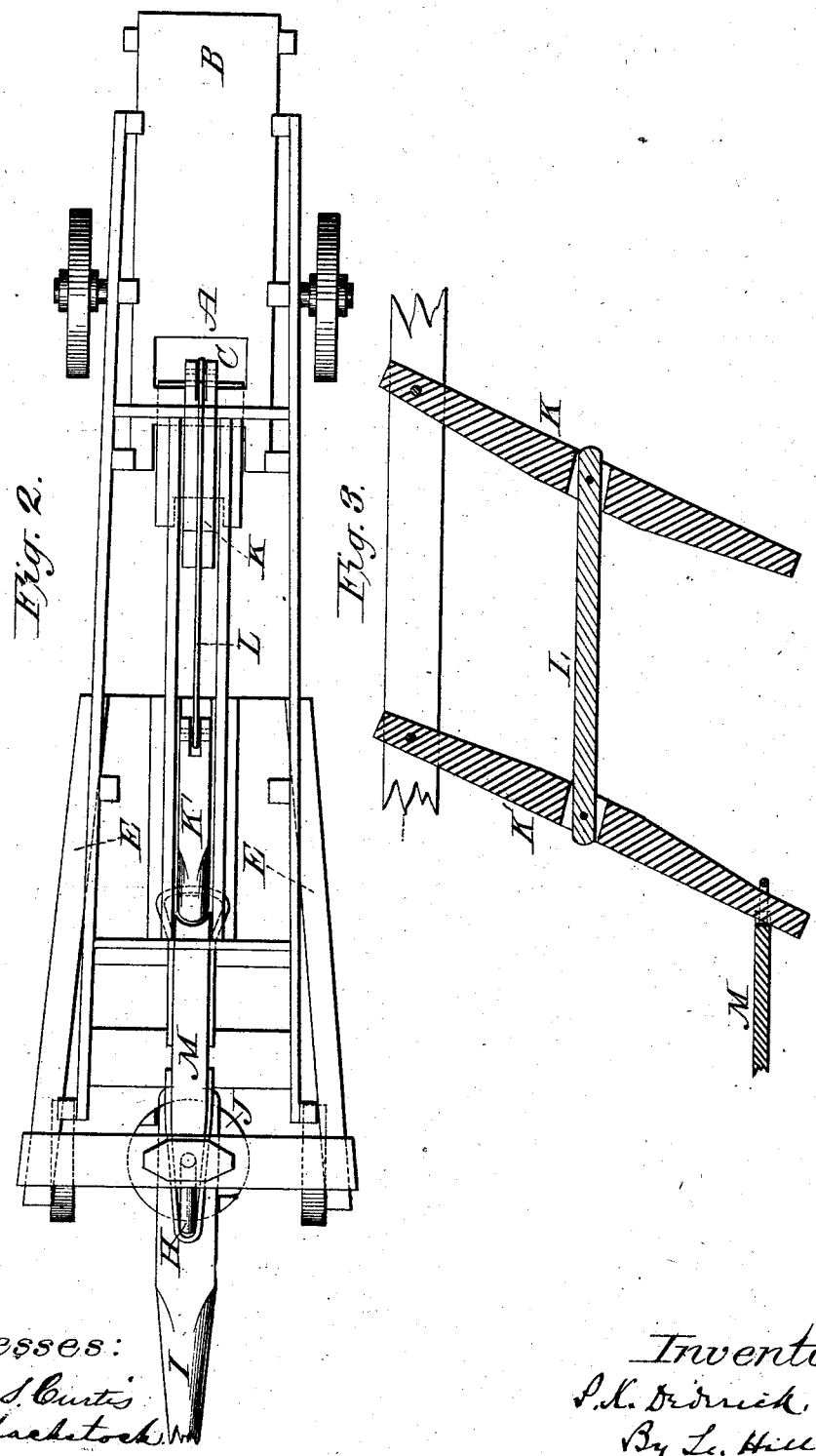

PETER K. DEDERICK, OF ALBANY, NEW YORK.

BALING-PRESS.

SPECIFICATION forming part of Letters Patent No. 224,280, dated February 10, 1880.

Application filed September 11, 1879.

*To all whom it may concern:*

Be it known that I, PETER K. DEDERICK, of Albany, in the county of Albany and State of New York, have invented certain new and useful Improvements in Baling-Presses; and I do hereby declare the following to be a full and exact description of the same, reference being had to the accompanying drawings, forming part of this specification, in which—

Figure 1 represents a longitudinal sectional view; Fig. 2, a top-plan view, and Fig. 3 a view of a modification.

Similar letters of reference in the several figures denote the same parts.

This invention relates generally to that class of baling-presses known as "perpetual" or "continuous" presses, for which numerous Letters Patent of the United States have been granted and issued to me since Patents Nos. 132,566 and 132,639 of October 29, 1872; and it relates more particularly to such of that class as combine in one machine a press proper and a horse-power for operating the same, as shown in another application for Letters Patent filed by me in the United States Patent Office on the 21st day of August, 1879. The machine described in said last-mentioned application is provided with two supporting-trucks—one arranged under the press-box and the other under the power end of the machine, that under the power end of the machine being connected by means of the crank or power shaft.

The horse-lever or sweep is connected to the power-shaft, so that the horses, in their circuit, pass between the trucks at about the middle of the machine, the frame-work being arched at said point to afford a passage-way, and the connections between the power-shaft and the traverser being also arched for a similar purpose.

The present invention consists in the employment, as a substitute for the arched connections in the machine referred to, of two sway-bars, fulcrumed on opposite sides of the passage-way, and connected so as to move simultaneously and together, the lower end of one of said bars being suitably guided and connected by a pitman to the power or crank shaft, and the lower end of the other of said bars being connected to the traverser.

In the accompanying drawings, A represents the press-box of the machine; B, the bale-chamber; C, the feed-hopper; D, timbers which connect the press proper with the frame of the power; E, the frame of the power; F, the truck under the press proper; G, the truck under the power-frame; H, the crank or power shaft; I, the sweep or horse-lever; J, the lug-plate keyed to the power-shaft, and with the lugs of which the sweep or horse-lever engages when rotated, to drive said power-shaft.

K K' are the sway-bars, fulcrumed to the timbers D at or near their middles, as seen in Fig. 1, or near their upper ends, as seen in Fig. 3, and connected by a bar, L, at their upper ends, as shown in Fig. 1, or at or near their middles, as in Fig. 3.

The lower end of the sway-bar K' is guided in suitable ways in the power-frame, and to it is connected the pitman M of the crank or power shaft.

The lower end of the sway-bar K is connected to the traverser, either directly, or preferably by means of a short bar or pitman, N, as shown.

To operate the machine, the horses are attached to the outer end of the sweep and caused to travel around in a circular path between the two trucks and through the passage-way O, the mechanism being so timed in its movements that when the horses go through said passage-way the sway-bars will be in such position as to leave said passage-way entirely open and unobstructed.

Each round of the horses is calculated to cause one complete reciprocation of the traverser; but this order of operation can, of course, be departed from by a proper adjustment of the parts.

I prefer to fulcrum the bars K K' at their middles and connect them at their upper ends, as shown in Fig. 1; but they may be fulcrumed at their upper ends and connected at or near their middles, as shown in Fig. 3, if desirable. This manner of carrying the operative connections over the passage-way is very simple and convenient, and is found to work admirably.

I claim as my invention—

The combination, with the combined press and horse-power, constructed with the passage-way between the trucks, as set forth, of the sway-bars, fulcrumed on opposite sides of said passage-way, and connected together and to the operating-pitman and traverser, substantially as described.

P. K. DEDERICK.

Witnesses:
R. J. VAN SCHOONHOVEN,
W. A. SKINKLE.